(No Model.)
W. VON SIEMENS.
APPARATUS FOR EXTRACTING METALS FROM THEIR ORES.
No. 452,125. Patented May 12, 1891.
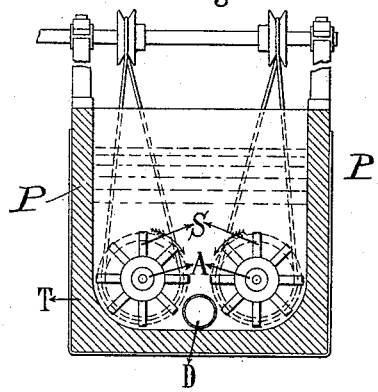
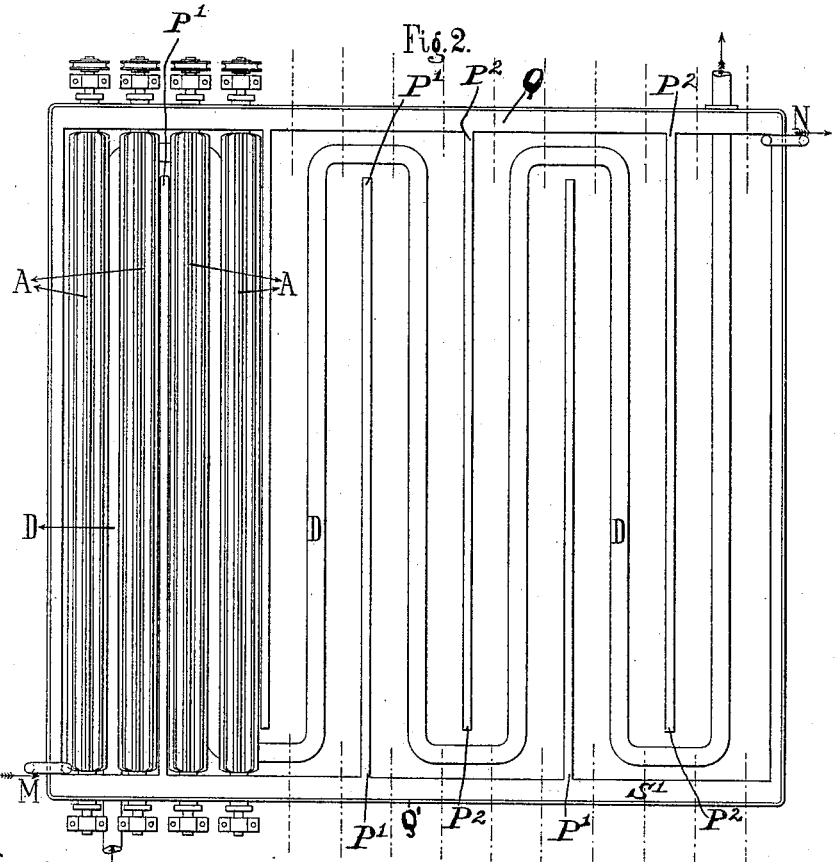

UNITED STATES PATENT OFFICE.

WERNER VON SIEMENS, OF BERLIN, GERMANY, ASSIGNOR TO SIEMENS & HALSKE, OF SAME PLACE.

APPARATUS FOR EXTRACTING METALS FROM THEIR ORES.

SPECIFICATION forming part of Letters Patent No. 452,125, dated May 12, 1891.

Application filed July 9, 1889. Serial No. 316,915. (No model.) Patented in Spain April 10, 1889, No. 9,318, and in Italy May 30, 1889, No. 25,017.

*To all whom it may concern:*

Be it known that I, WERNER VON SIEMENS, of the city of Berlin, in the Kingdom of Prussia, German Empire, have invented a new and useful Improvement in Electrolytical Apparatus, (for which I have obtained patents in Spain, No. 9,318, bearing date April 10, 1889, and in Italy, No. 25,017, bearing date May 30, 1889,) of which the following is a specification.

My present invention relates to improvements in apparatus for dissolving or extracting metals from their ores, and is especially adapted to be used in connection with the process described in Letters Patent of the United States No. 415,576, granted to me November 19, 1889. For these purposes I use a trough of great length, (in comparison with its breadth,) within which revolve in opposite directions two shafts carrying paddles or beaters, said paddles or beaters revolving entirely below the level of the contents of the said trough. These contents, consisting of a dissolving-liquid and powdered ore kept in agitation by the paddles or beaters aforesaid, are introduced at one end of the said trough and are taken out at the opposite end thereof.

In order to facilitate the dissolving of the metallic contents of the ore, a pipe is led through the trough at its bottom and carries steam or superheated water, thus heating the solution.

My invention consists of the details of the construction, arrangement, and combination of the several parts of which it is composed, as will be hereinafter more fully described and claimed.

Referring to the accompanying drawings, in which corresponding parts are designated by similar letters, Figure 1 is a transverse section of a trough constructed according to my invention; and Fig. 2 is a plan view showing a modified form thereof, in which, for economy of space, the troughs are arranged in a zigzag manner. The trough T may be made of any suitable material and is of great length, (when compared with its breadth,) the liquid and ore entering at one end thereof, as at M, and flowing out at the opposite end, as at N. Within this trough revolve the two shafts A, carrying the blades or beaters S, which revolve in opposite directions and below the level of the upper surface of the contents of the trough. In the bottom of this trough is the pipe D, connected to any suitable water-heater, and I so place this pipe that it is between and below the beaters S upon the two shafts A.

In Fig. 2 I have shown the troughs arranged in a zigzag manner, where the partitions P' P², almost abutting against the sides Q and Q', respectively, of the trough, form a zigzag channel, through which the mixed liquids and ores flow in passing from one end of the trough to the other. These partitions P' P² rise above the surface of the liquid and perform the same functions as the sides P of the long trough. (Shown in Fig. 1.) It is immaterial whether the length of the channel for the liquid and ores be obtained by using a long and narrow trough, as that shown in cross-section in Fig. 1, or whether the said length is obtained by using a broad trough with labyrinthine channels therein, as shown in Fig. 2. Great length of trough is desirable, however, because it is very important that the dissolving-liquid should remain a long time in contact with the pulverized ore, in order that a sufficient extraction of the metallic contents of the latter may be obtained. This length of time in contact may be obtained either by using a short trough with a slow speed for the ingredients, wherein the output for each trough will be small, or by using a longer trough with a higher rate of speed, wherein the output will be proportionately larger. Moreover, the particles of suspended and sedimentary ore are better carried along by a rapid current. All other things being equal, the output then will be in direct proportion to the length of the trough. As this process of extraction advances gradually with the length of the time the ore is suspended or dragged along the bottom by the current in the dissolving-solution there will be at each section (taken vertically of axis of the trough) a solution of a different chemical composition. Now to prevent a detrimental mixture by diffusion of the already advanced solution of the ore and liquid entering the trough or near the inlet thereof, it is necessary to build the latter not under a certain length, as otherwise this mixing in axial direction (by diffusion) would become so considerable that neither a thoroughly-extracted ore nor a perfectly-saturated solution would leave the trough. By placing the beaters or stirrers below the level of the upper surface of the liquid I am able to cause the metallic contents to remain constantly suspended therein, and at the same time to prevent any frothing, which, by causing air to circulate within the solution, would be detrimental on account of the oxidation occasioned thereby.

Having thus described my invention, what I desire to claim by Letters Patent is—

1. The combination of a trough for the flow of the liquid, with an inlet at one end and an outlet at the other, with two longitudinal shafts in the said trough, said shafts carrying beaters and being entirely immersed in the liquid contained in the trough, and a heating-pipe located below and between the said shafts, substantially as described.

2. The combination of a trough for the flow of liquid, composed of numerous sections connected at alternate ends, with an inlet at one end and an outlet at the other, with two longitudinal shafts in each section of the said trough, said shaft carrying beaters and being entirely immersed in the liquid contained in the trough, and a heating-pipe located below and between the said shafts, substantially as described.

WERNER VON SIEMENS.

Witnesses:
B. ROI,
GEO. H. MURPHY.